United States Patent
Jan et al.

[19]

[11] Patent Number: 5,805,574
[45] Date of Patent: Sep. 8, 1998

[54] ADAPTIVE SWITCH RESOURCE ALLOCATION IN A SATELLITE COMMUNICATION SYSTEM

[75] Inventors: Yih Guang Jan, Phoenix; Kadathur Subramanya Natarajan, Mesa; Kenneth Maynard Peterson, Phoenix, all of Ariz.

[73] Assignee: Motorola, Inc., Schaumburg, Ill.

[21] Appl. No.: 508,807

[22] Filed: Jul. 28, 1995

[51] Int. Cl.$^6$ ........................................... H04J 15/00
[52] U.S. Cl. ..................... 370/329; 370/215; 370/316; 455/12.1
[58] Field of Search ..................... 370/329, 316, 370/389, 395, 332, 215; 379/215; 455/12.1, 33.1, 51.2

[56] References Cited

U.S. PATENT DOCUMENTS

| | | | |
|---|---|---|---|
| 4,813,040 | 3/1989 | Futato | 370/111 |
| 4,947,421 | 8/1990 | Toy et al. | 379/215 |
| 5,226,045 | 7/1993 | Chuang | 370/332 |
| 5,452,471 | 9/1995 | Leopold et al. | 455/12.1 |
| 5,509,004 | 4/1996 | Bishop, Jr. et al. | 455/12.1 |
| 5,544,160 | 8/1996 | Cloonan et al. | 370/395 |
| 5,603,091 | 2/1997 | Linquist et al. | 455/51.2 |

FOREIGN PATENT DOCUMENTS

| | | | |
|---|---|---|---|
| 0073917 | 7/1982 | European Pat. Off. | H04Q 3/68 |
| 0569906 | 5/1993 | European Pat. Off. | H04Q 11/04 |
| 0569913 | 5/1993 | European Pat. Off. | H04L 12/56 |
| 0629064 | 6/1994 | France | H04L 12/56 |

*Primary Examiner*—Douglas W. Olms
*Assistant Examiner*—Shick Hom
*Attorney, Agent, or Firm*—Gregory J. Gorrie

[57] ABSTRACT

A telecommunication network (10) includes satellites (12) in which cellular base station switches (42) are located. Each switch (42) is hardware configured to require the use of relatively few interconnection segments but would suffer a significant amount of call blocking if operated in a conventional manner. A new call setup process (96) is performed whenever a request to setup a new call is received at the switch (42). The process (96) defines new connections through switch 42 for ongoing calls while simultaneously defining a new connection for the new call. In addition, the process (96) forces the new connections to use only those interconnection segments that are reasonably required to implement the new connections. Segments that are not required are deactivated (128) to reduce power consumption.

22 Claims, 7 Drawing Sheets

ADAPTIVE SWITCH RESOURCE ALLOCATION IN A SATELLITE COMMUNICATION SYSTEM

FIELD OF THE INVENTION

The present invention relates generally to telecommunication switches. More specifically, the present invention relates to the allocation of calls to switching segments located between network ports and user ports of the switch.

BACKGROUND OF THE INVENTION

Telecommunication switches connect calls from network ports to user ports, and vice-versa. Network ports face a communication network within which a switch operates, and user ports face a user or subscriber of the network. Telecommunication switches can have many network ports and many user ports. One of the goals of the switch is to be able to form a connection between any network port and any user port. Another goal is to simultaneously accommodate as many connections as possible.

Telecommunication switches may be characterized by an undesirable phenomenon of blocking. Blocking occurs when a connection through the switch for an ongoing call prevents a new call from being connected between network and user ports. In accordance with conventional telephony, a user attempting to place a new call hears a busy signal when blocking occurs. Blocking can prevent the network from providing communication services that it otherwise may have the capacity to provide.

The degree to which blocking occurs can be controlled by the design and configuration of the switch. Non-blocking switches are known to those skilled in the art. For a non-blocking switch, simultaneous connections can be accommodated for all network ports and all user ports, assuming that the switch has an equal number of network and user ports. However, as the switch is designed to experience less and less blocking, the switch typically requires more and more hardware and becomes more and more complex. Accordingly, switches typically are designed to experience as little blocking as possible given cost, reliability, power consumption, space, and weight constraints. Conventional switches tend to be located on or near the surface of the earth where space and weight constraints are of little importance and where ample power sources are available to accommodate any amount of power consumption. Consequently, conventional switches tend to experience relatively little blocking because no serious penalty results from such a design. As a result, conventional terrestrial switches are unlikely to fail to provide communication services due to blocking, even during periods of high communication traffic.

However, such conventional designs are impractical for a switch which is located in a satellite orbiting the earth. In a satellite, costs, reliability, power consumption, space, and weight constraints impose serious penalties on switch designs which experience relatively little blocking. Hence, a switch located in an orbiting satellite may be forced to accept a design which experiences more blocking than a conventional terrestrial switch. Using conventional switching technology, such a switch would be much more likely to fail to provide requested communication services during high traffic periods due to blocking.

Accordingly, a need exists for a switch that is unlikely to fail to provide communication services, even during periods of high traffic, while meeting severe power consumption and other constraints typical of operation in satellites.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
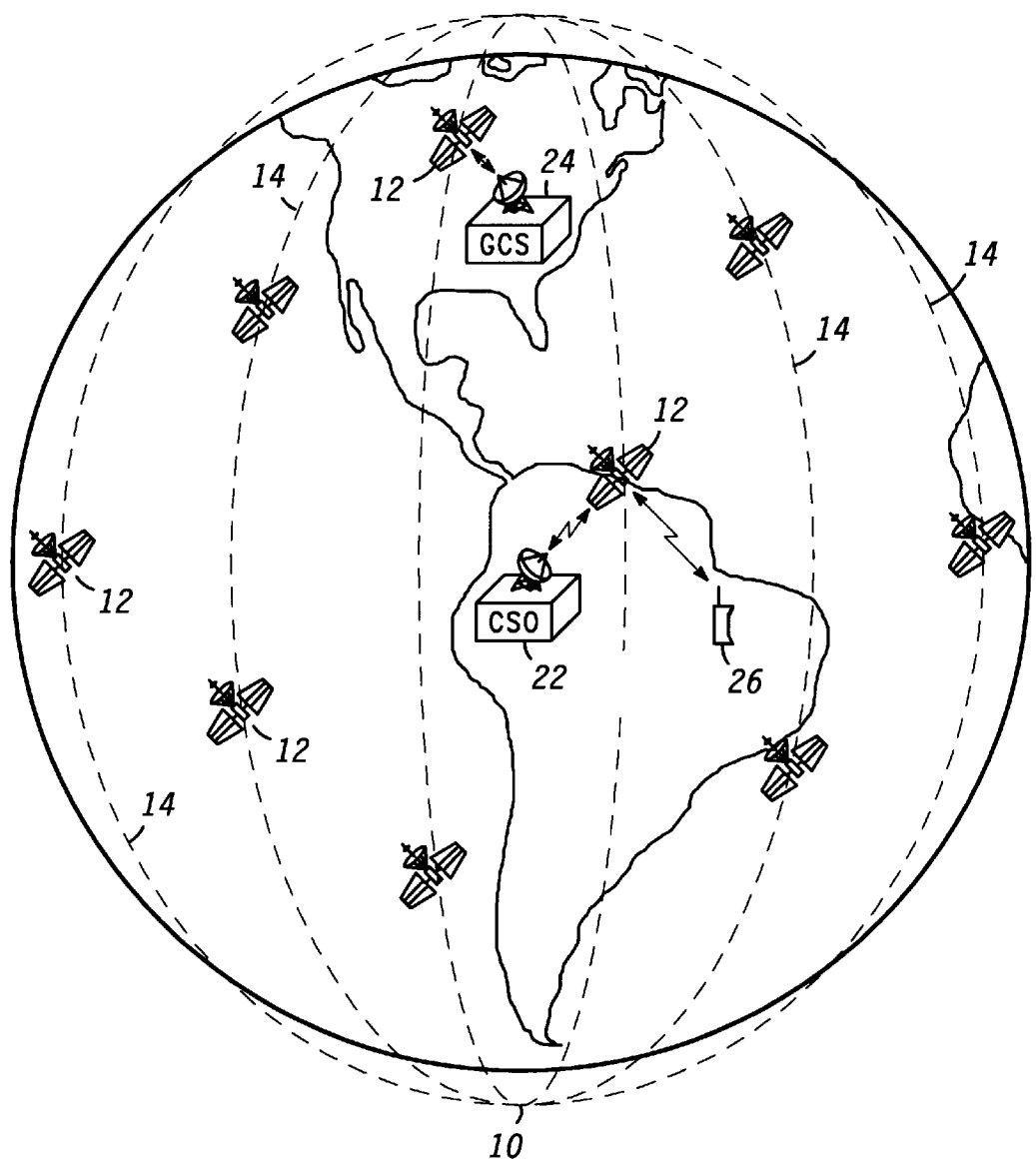
FIG. 1 shows a diagram of an environment in which the present invention may be practiced.

FIG. 1 illustrates a satellite-based communication network 10. Network 10 is dispersed over the earth through the use of a constellation of above-the-earth cellular base station switching offices placed in orbiting satellites 12. In the currently preferred embodiment, satellites 12 occupy polar, low-earth orbits 14. In particular, the preferred embodiment of network 10 uses six polar orbital planes, with each orbit holding eleven satellites 12 for a total of sixty-six satellites 12. For clarity, FIG. 1 illustrates only a few of these satellites 12.

Orbital planes 14 and satellites 12 are distributed around the earth. In the example depicted for the currently preferred embodiment, each orbit 14 encircles the earth at an altitude of around 765 km. Due to the relatively low orbits of satellites 12, substantially line-of-sight electromagnetic transmissions from any one satellite cover a relatively small area of the earth at any point in time. For example, when satellites 12 occupy orbits at around 765 km above the earth, such transmissions may cover "footprint" areas around 5000 km in diameter. Moreover, due to the low-earth character of orbits 14, satellites 12 travel with respect to the earth at around 25,000 km/hr so that a satellite 12 remains within view of a point on the surface of the earth for a maximum period of around nine to ten minutes. Within orbits 14, satellites 12 maintain relatively constant distances between one another. However, orbits 14 cause satellites 12 to converge toward one another while approaching the polar regions and diverge away from one another while approaching the equator.

Satellites 12 communicate with devices on the ground through many central switching offices (CSOs) 22, of which FIG. 1 shows only one, a few ground control stations (GCSs) 24, of which FIG. 1 shows only one, and any number of subscriber units 26, of which one is shown in FIG. 1. CSOs 22, GCSs 24, and subscriber units 26 may be located anywhere on the surface of the earth or in the atmosphere above the earth.

GCSs 24 preferably perform telemetry, tracking, and control (TT&C) functions for the constellation of satellites 12. Preferably, CSOs 22 operate as communication nodes in network 10. Diverse terrestrial-based communications systems, such as the worldwide public switched telecommunications network (not shown), may access network 10 through CSOs 22. Due to the configuration of the constellation of satellites 12, at least one of satellites 12 is within view of each point on the surface of the earth at all times. Accordingly, network 10 may establish a communication circuit through the constellation of satellites 12 between any two subscriber units 26, between any radio unit 26 and a CSO 22, or between any two CSOs 22.

Figure 2:
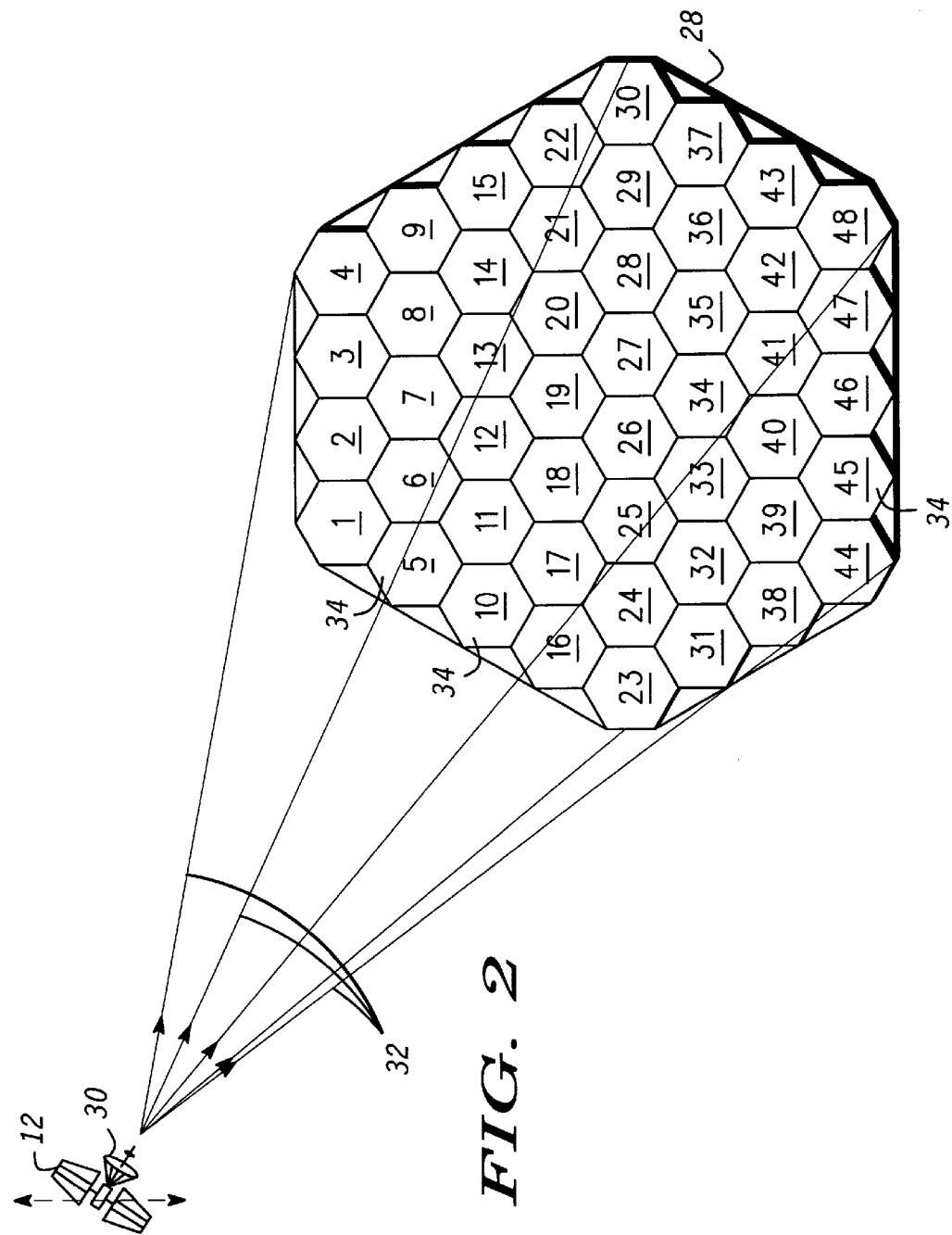
FIG. 2 shows a schematic diagram of a pattern of cells formed on the surface of the earth by an antenna of a satellite.

FIG. 2 schematically shows a cellular footprint pattern 28 formed on the surface of the earth by a cellular base station switching office located in a satellite 12. Each satellite 12 includes a multibeam, directional antenna 30. Each antenna 30 projects numerous discrete antenna beams or patterns 32 toward the earth's surface at numerous diverse angles away from its satellite 12. FIG. 2 shows a diagram of a resulting pattern of cells 34 that beams 32 form on the surface of the earth. Each beam 32 is associated with a cell 34 in a one-to-one correspondence, and each cell 34 represents the area defined by the intersection of a beam 32 with the surface of the earth. Each cell 34 within footprint 28 occupies a unique position within footprint 28. These positions are distinguished from one another through the use of a beam ID, listed as 1 through 48 in FIG. 2. In the preferred embodiment of the present invention, all satellites 12 are configured substantially as depicted in FIG. 2. Thus, other satellites 12 (not shown) form other similar footprints (not shown). Desirably, a continuous blanket of cells 34 substantially covers the entire surface of the earth.

Network 10 (see FIG. 1) communicates through satellites 12 with subscriber units 26 (see FIG. 1) using the electromagnetic spectrum. This communication takes place through antenna 30 and beams 32. Those skilled in the art will appreciate that multiple beams 32 formed by antenna 30 define a geometry and do not imply a particular direction of communication. In other words, communications may be transmitted and/or received through the beams 32 projected by antenna 30 toward the earth's surface. Other antennas (not shown) on satellites 12 extend communications to other satellites 12 and/or CSOs 22 and GCSs 24.

While FIGS. 1–2 and the above-presented discussion describe a preferred orbital geometry for network 10, those skilled in the art will appreciate that the cellular base station switching offices which satellites 12 provide need not be configured precisely as described herein. For example, in some embodiments, the present invention may be practiced using other types of telecommunication switches, and these other types of switches may be located on the surface of the earth or in orbits other than those described herein. Likewise, the precise number of telecommunication switches may vary from network to network.

Figure 3:
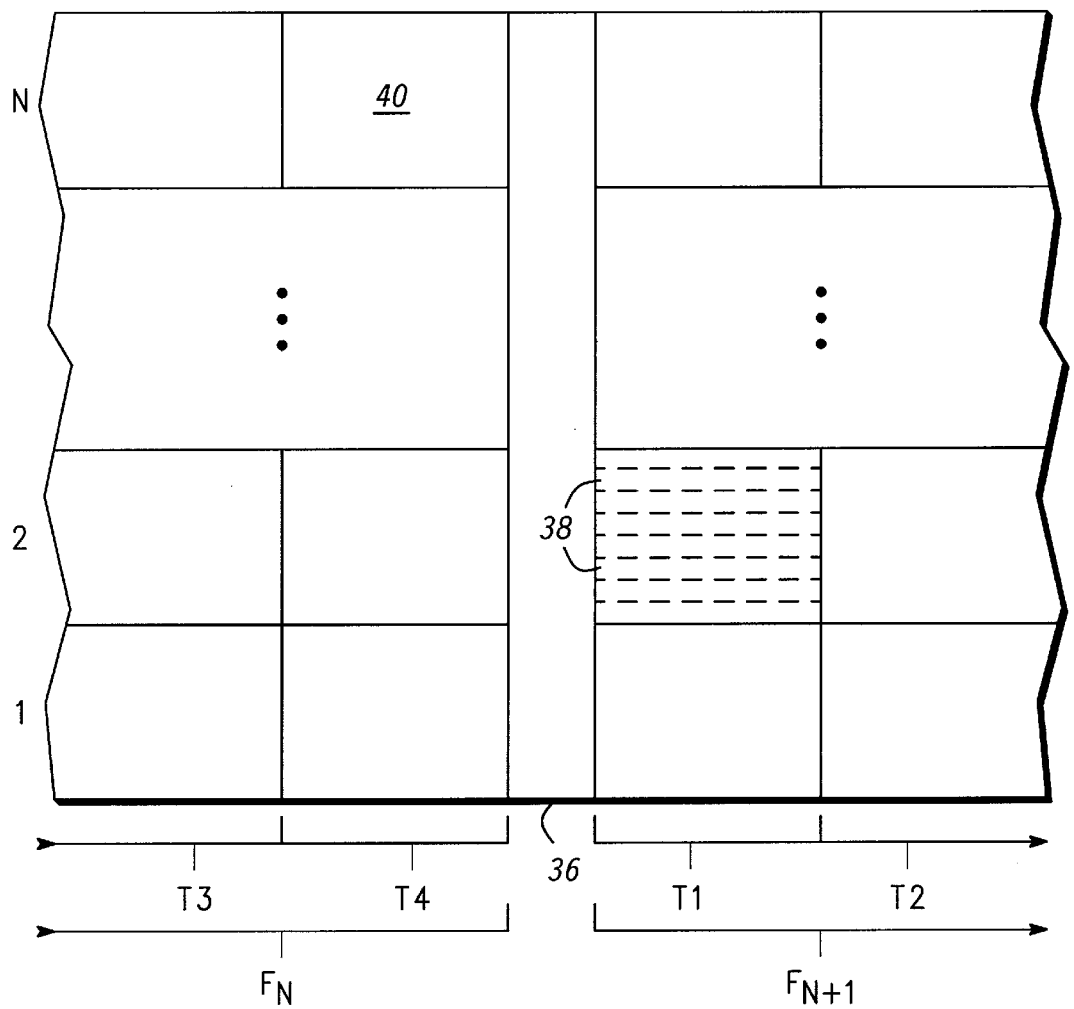
FIG. 3 shows a format diagram of a portion of the electromagnetic spectrum used by a cellular telecommunication network to convey communications.

FIG. 3 shows a format diagram of a portion of the electromagnetic spectrum used by network 10 to communicate with subscriber units 26. Generally, FIG. 3 depicts a time division multiple access, frequency division multiple access (TDMA/FDMA) format. All calls are partitioned temporally into frames. FIG. 3 shows final time slots T3 and T4 of a frame $F_N$ followed by initial time slots T1 and T2 of a frame $F_{N+1}$. In the preferred embodiment, the frames may be around 360 milliseconds in duration, and each frame may include four time slots, each having a duration of around 90 milliseconds. A small inter-time-slot gap may be provided between time slots T1–T2, T2–T3, and T3–T4. A much longer inter-frame gap 36 is provided between frames.

The frequency spectrum is partitioned into any number of frequency channels 38, only a few of which are specifically indicated in FIG. 3. Thus, a continuous communication channel may be formed, for example, by allocating a frequency channel 38 in a specified time slot through a stream of frames. The preferred embodiment for the cellular base station switching offices placed in satellites 12 employs channelizers (discussed below) which tune blocks of frequency channels rather than individual frequency channels. To accommodate these channelizers, frequency channels 38 are grouped together into frequency subbands, labeled 1-N in FIG. 3. Each subband includes any number, depicted in FIG. 3 as eight to accommodate the channelizers used by the preferred embodiment, of discrete frequency channels 38.

Channel reuse units 40 are the smallest block of channels that can be allocated to a single beam 32 (see FIG. 2). A channel reuse unit 40 represents an entire frequency subband for the duration of a single time slot over a continuous stream of frames. The number of channel reuse units available to network 10 may be determined by multiplying the number of time slots per frame by the number N of frequency subbands.

Referring to FIGS. 1–3, network 10 allocates reuse units 40 to beams 32 and cells 34 in accordance with a frequency reuse plan. Those skilled in the art fully appreciate that the frequency reuse plan prevents reuse units 40 from being reused in adjacent cells 34 to reduce interference but allows reuse in remote cells 34 to get the most possible use out of the spectrum. In the preferred embodiment, GCS 24 defines frequency reuse plans for network 10, and these plans change in time to track the movement of satellites 12. The frequency reuse plans desirably allocate more reuse units 40 to cells 34 covering areas where high call traffic is expected and less reuse units 40 to cells 34 covering areas where low call traffic is expected. Due to overlap between footprints 28 as orbits 14 converge when satellites 12 approach the polar regions, some beams 32 may have no reuse units 40 allocated to them. Desirably, the frequency reuse plans are worked out before they are needed, and each satellite 12 receives its portion of upcoming frequency reuse plans through network 10.

Figure 4:
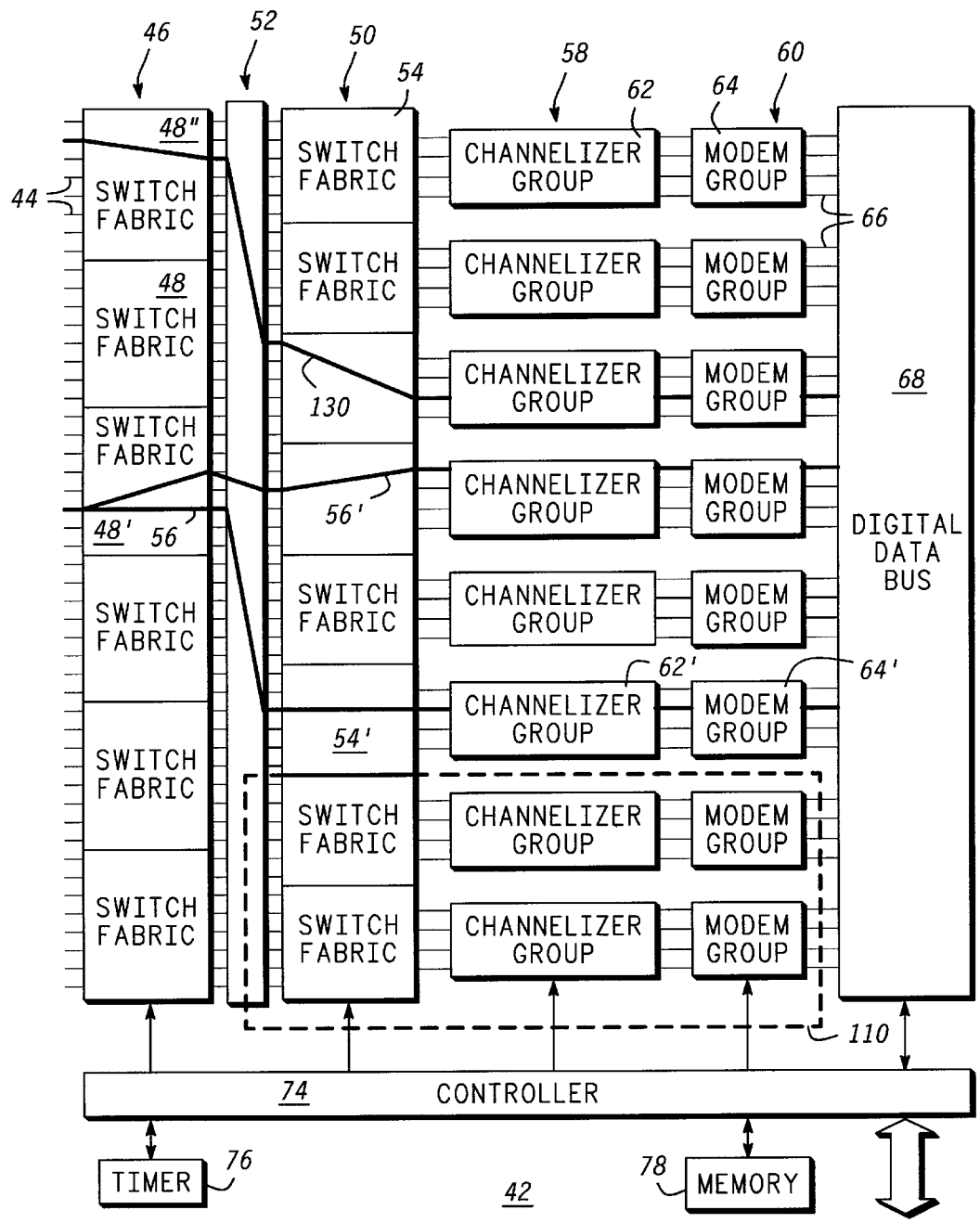
FIG. 4 shows a block diagram of a cellular base station switching office located in a satellite.

FIG. 4 shows a block diagram of a cellular base station switch 42 located in a satellite 12. Desirably, all satellites 12 employ a similar construction. Switch 42 includes several user ports 44. User ports 44 are preferably bidirectional communication paths that route call traffic to and from subscriber units 26 (see FIG. 1). User ports 44 may be satellite beams that carry user calls. User ports 44 couple through RF processing circuits (not shown) to antenna 30 (see FIG. 2). One user port 44 is provided for each beam 32 (see FIG. 2). Accordingly, for the preferred embodiment switch 42 includes forty-eight user ports 44 to accommodate the forty-eight beams 32 that define the forty-eight cells 34 (see FIG. 2) supported by switch 42.

User ports 44 couple to a first switching bank 46. First bank 46 is configured into a plurality of individual switch fabric segments 48, each of which handles a discrete portion of user ports 44. For the preferred embodiment, switch fabric segments 48 each employ an 8x8 configuration, and six of segments 48 are needed to handle all of the forty-eight user ports 44. First switching bank 46 couples to a second switching bank 50 through interconnections 52. Second switching bank 50 handles the same number of ports facing first bank 46 as first bank 46 handles facing user ports 44. Second bank 50 is configured into a plurality of individual switch fabric segments 54, each of which handles a single connection to every switch fabric segment 48. Thus, one connection may be found through interconnections 52 between each combination of a switch fabric segment 48 and a switch fabric segment 54. In the preferred embodiment, switch fabric segments 54 each employ a 6x4 configuration, and eight of segments 54 are needed to handle all six of switch fabric segments 48.

Those skilled in the art will appreciate that this configuration of segments 48 and 54 through interconnections 52 may lead to a significant degree of blocking. For example, a connection 56 for an ongoing call that uses a communication path through a user port 44', a switch fabric segment 48', and a switch fabric segment 54' prevents other communication paths from passing through any other user port 44 and switch fabric segments 48' and 54'. Since a portion of the other user ports 44 couple only to switch fabric segment 48', any calls through these other ports are blocked from reaching switch fabric 54'. On the other hand, those skilled in the art will appreciate that this configuration employs less hardware than a configuration which experiences less blocking. Consequently, this configuration consumes less power, may be implemented using less space and weight, and is more reliable.

Second switching bank 50 couples to a channelizer bank 58, and channelizer bank 58 couples to a modem bank 60. Channelizer bank 58 includes several individual channelizer groups 62. Each channelizer group 62 includes a plurality of discrete channelizers. As a result, each port of second switching bank 50 which faces channelizer bank 58 has its own channelizer. Likewise, modem bank 60 includes several individual modem groups 64, and each modem group 64 includes a plurality of discrete modems. Each port of second switching bank 50 that faces channelizer bank 58 also has its own modem. For the preferred embodiment, eight channelizer groups 62 each include four channelizers, and eight modem groups 64 each includes four modems.

In the preferred embodiment, each channelizer, of which four are included in each channelizer group 62, can be tuned to accommodate a frequency range of three frequency subbands. Moreover, channelizer tuning may change between frames in gap 36 (see FIG. 3), where several milliseconds of dead time exist, but not within a frame where no extended duration of dead time resides. These factors provide additional blocking constraints for switch 42, but permit switch 42 to experience efficiencies in hardware component space requirements, weight, power consumption, and reliability. Additional blocking occurs because a channelizer which may be used only for one frequency subband and one time slot may be blocked from use in a different time slot if re-tuning would be required between time slots. Likewise, a channelizer which may be otherwise available to handle calls associated with multiple reuse units 40 (see FIG. 3) may be blocked when the reuse units 40 have frequency subbands that are too far apart.

Modem groups 64 have network ports 66 which couple to a digital data bus 68. Each modem of a modem group 64 has its own network port 66. Digital data bus 68 couples to controller 74 which couples through other modem and RF circuits (not shown) which form data communication paths with other satellites 12, with CSOs 22 (see FIG. 1) and with GCSs 24 (see FIG. 1). Within the preferred embodiment of network 10, call data are distributed as packetized digital data. Controller 74 packetizes the call data, adds appropriate call ID and other packet overhead data, and causes the call data to flow to and from selected network ports 66 in accordance with the specific call to which the data apply. Each switch fabric 48 and 54, each channelizer group 62, and each modem group 64 represent a segment of switch 42 that provides an interface between user ports 44 and network ports 66. By establishing a connection through switching banks 46 and 50, by appropriately tuning channelizers in channelizer groups 62, and by identifying appropriate network ports 66, call data is communicated through switch 42 with a subscriber unit 26.

In addition, switch 42 includes a programmed controller 74. Controller 74 connects to each segment of switch 42. In particular, controller 74 connects to each switch fabric 48 of first switching bank 46, to each switch fabric 54 of second switching bank 50, to each channelizer of each channelizer group 62 in channelizer bank 58 and to each modem group 64. FIG. 4 shows only a few of these connections for clarity. Through these connections, controller 74 selects connections through each switch fabric 48 and 54 and tunes channelizers. In addition, through these connections, controller 74 activates the segments to a higher power operational mode and deactivates the segments to a lower power standby mode of operation. Controller 74 additionally couples to a timer 76, which aids controller 74 in performing functions which are responsive to the passage of time, and to a memory 78.

Figure 5:
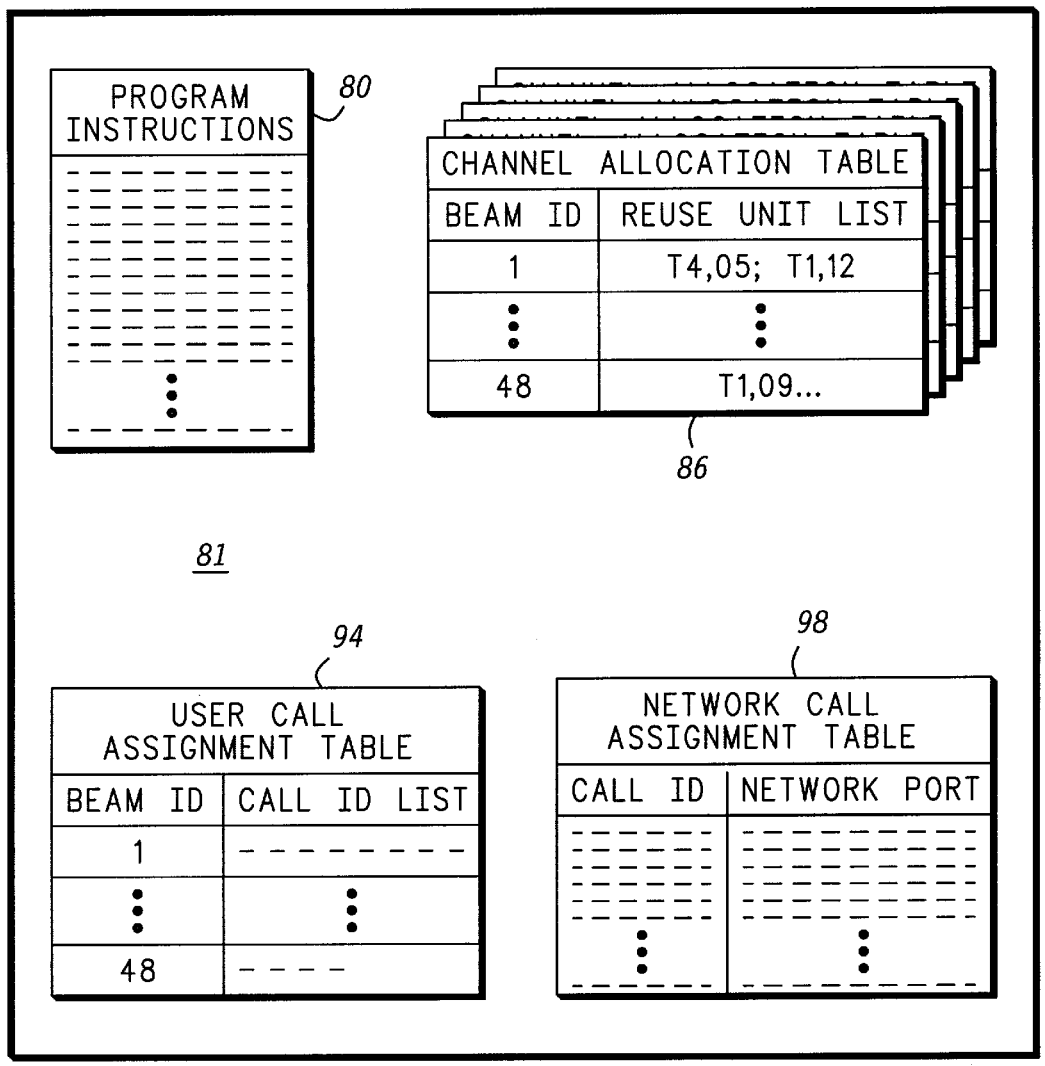
FIG. 5 shows a block diagram of various data structures stored in a memory of the satellite cellular base station switching office.

Controller 74 may be implemented using one or more microprocessors or other programmable circuits in a manner well known to those skilled in the art. FIG. 5 shows a block diagram of examples of some of the data structures stored in memory 78 of switch 42. For example, controller 74 (see FIG. 4) executes programming instructions 80, which are stored in memory 78, to control the operation of switch 42. This operation is discussed below in connection with FIGS. 6 and 7.

Figure 6:
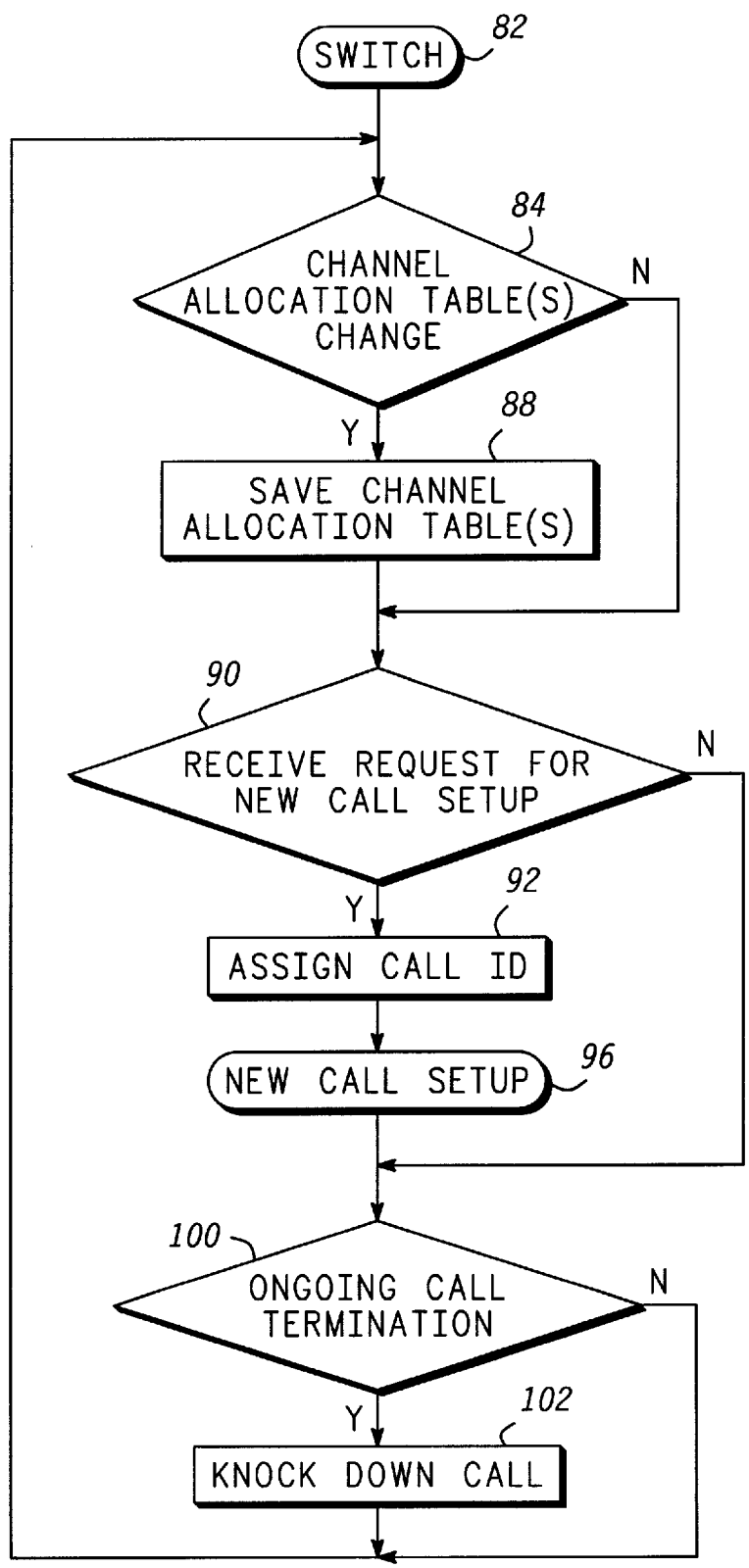
FIG. 6 shows a flow chart of a switch process performed by the satellite cellular base station switching office.

FIG. 6 shows a flow chart of a switch process 82 performed by switch 42 (see FIG. 4). Switch process 82 is repetitively performed during the operation of satellite 12 (see FIG. 1) to cause satellite 12 to function as a cellular base station switching office. As indicated by ellipsis in FIG. 6, switch process 82 may include any number of other procedures and tasks which are not related to the present invention. Among the various procedures and tasks performed by process 82, a query task 84 determines whether the switch 42 has received one or more channel allocation tables 86, a block diagram of which is shown in FIG. 5. If channel allocation tables 86 have been received, then a task 88 saves the tables 86 in memory 78 (see FIGS. 4 and 5) where they can by used later.

Channel allocation tables 86 are received from GCS 24 (see FIG. 1) from time to time (preferably at prescribed update times) and define associations between reuse units 40 (see FIG. 3) and beams 32 (see FIG. 2). Tables 86 are arranged so that an active table 86 or an active page of table 86 defines the associations that are valid for a satellite 12 (see FIG. 1) while the table 86 or page is active. Table 86 identifies which reuse units 40, if any, are to be used in which beams 32 to support communication with subscriber units 26. Any number of reuse units 40 may be used in any beam 32. Each reuse unit 40 may be identified by its time slot and frequency subband. As discussed above, these associations are arranged to accomplish various desirable goals for network 10. These goals include allocating reuse units 40 so that the frequency spectrum allocation for each satellite 12 actually exceeds predicted demand. Thus, the allocated reuse units 40 may be viewed as a maximum number of reuse units 40 that are available for use by a satellite 12, and this maximum number will usually exceed actual demand.

Referring back to FIG. 6, after task 88 and when task 84 determines that no allocation table changes have occurred, a query task 90 determines whether a request to setup a new call has been received. The request may appear in the form of a signalling command and may originate from either a subscriber unit 26 (see FIG. 1) or from other elements of network 10, such as a CSO 22 (see FIG. 1). When a new call setup request is received, a call setup process is performed which includes a task 92. Task 92 assigns a call ID to the new call being setup. The call ID is a unique identifier within the domain of switch 42 (see FIG. 4). The call ID may be associated with the beam 32 (see FIG. 2) within which the call will occur. This association may be established in a user call assignment table 94, an exemplary block diagram of which is shown in FIG. 5. Table 94 lists the call IDs which are currently active for each beam 32. At any given moment, the number of call IDs associated with each beam 32 represents the actual demand for communication services through each beam.

After task 92, a new call setup process 96 is performed. Among other things, process 96 establishes a connection through switch 42 for the new call. In establishing the connection through switch 42, process 96 also identifies the network port 66 (see FIG. 4) to use for the call. The network port's ID may be associated with the call ID in a network call assignment table 98, one exemplary block diagram of which is shown in FIG. 5. As a result of performing process 96, when switch 82 encounters packets having call ID data therein, switch 42 may quickly perform a table look up operation using table 98 (see FIG. 5) to identify the network port 66 to use in delivering the packet to a subscriber unit 26. Likewise, an inverse data structure to table 98 may be used to quickly find a call ID to apply to a packet which includes data taken from a particular network port 66. Process 96 performs additional functions, which are discussed below in connection with FIG. 7.

At the completion of new call process 96, switch 42 is configured to connect the new call in addition to any ongoing calls which may have already been connected through switch 42 before receiving the new call setup request. After process 96 and when task 90 determines that no new call setup request has been received, a query task 100 determines whether any ongoing calls have terminated. When an ongoing call terminates, a task 102 knocks down the call. Knock down task 102 removes the ongoing call's call ID from user call assignment table 94 (see FIG. 5) and breaks any links associating the ongoing call's call ID with a network port 66 (see FIG. 4) in network call assignment table 98 (see FIG. 5). Thus, actual demand for communication services decreases, and the previously allocated network port 66 will no longer be used.

After task 102 and when task 100 determines that no ongoing calls have terminated, program control loops back to repeat switch process 82. By continued operation of process 82 in a programming loop, a vast number of new calls can be connected through switch 42. When a connection for a new call is implemented, the new call then becomes an ongoing call. As more and more new calls become connected, the number of ongoing calls grows. However, when ongoing calls terminate, their connections through switch 42 are released and the number of ongoing calls connected through switch 42 shrinks.

Figure 7:
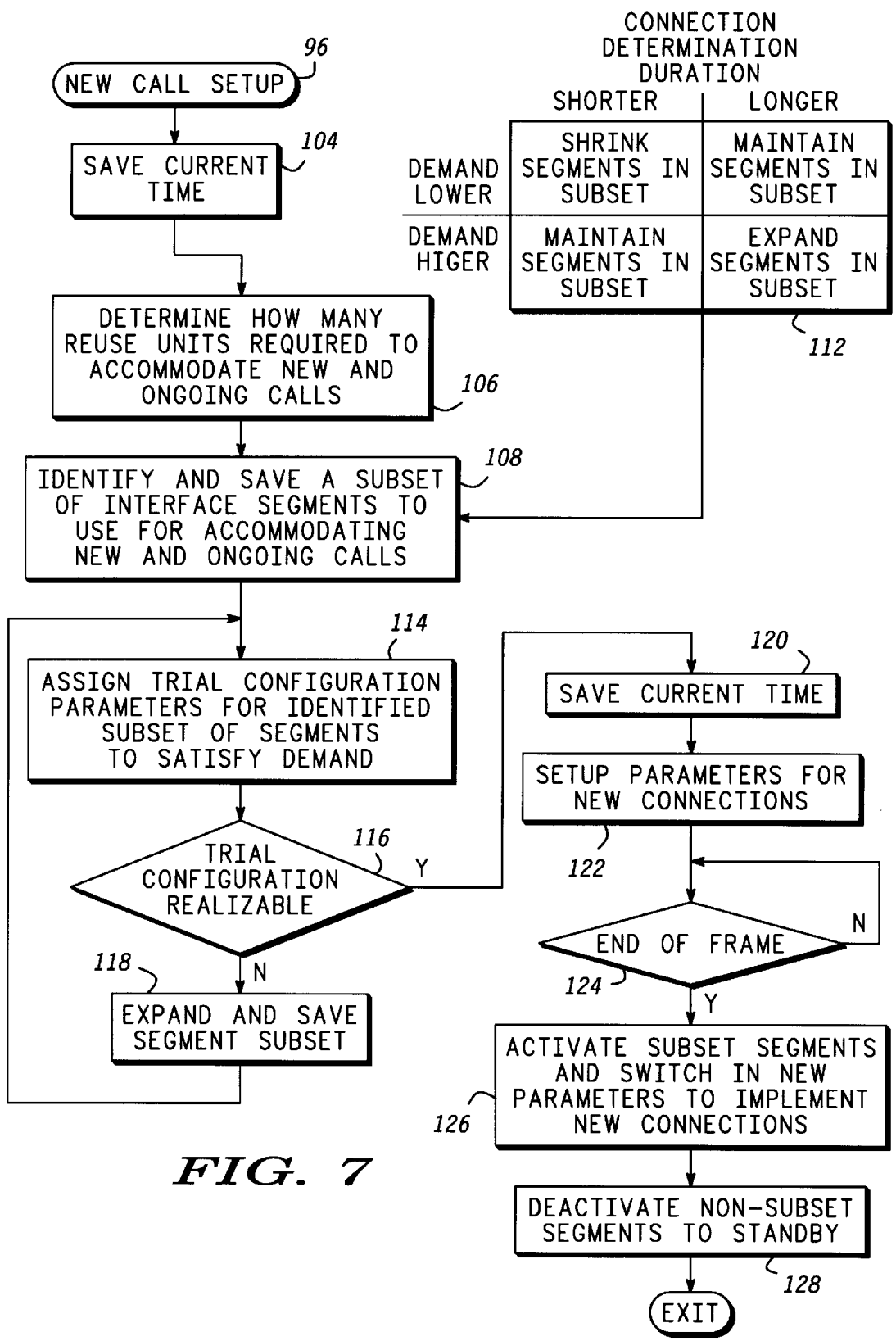
FIG. 7 shows a flow chart of a new call setup process performed by the satellite cellular base station switching office.

FIG. 7 shows a flow chart of new call setup process 96. Generally, process 96 reconfigures switch 42 so that connections for some ongoing calls are reconnected through switch 42 without terminating the calls. Reconnection is performed to the extent necessary to allow switch 42 to connect both the new call and the ongoing calls. This feature makes switch 42 unlikely to fail to provide communication services, even during periods of high traffic. In other words, a switch design which would otherwise experience significant blocking provides a substantially non-blocked level of communication service.

In addition, process 96 controls the routing of connections to use as few segments (see FIG. 4) as is reasonably possible. Those segments that are not needed to support connections are deactivated to a standby mode so that their power consumption is dramatically reduced. While switch 42 includes a sufficient number of segments to accommodate peak call traffic, only the segments which are needed to meet actual current call traffic demand are activated. Since peak call traffic occurs rarely, power consumption improvements result.

Process 96 includes a task 104 which saves data describing the current time. Task 104 is performed because process 96 monitors the duration required to determine new connections through switch 42 for all ongoing calls plus a new call. After task 104, a task 106 determines how many reuse units 40 (see FIG. 3) are required per beam to accommodate the current call traffic demand. Task 106 may evaluate user call assignment table 94 (see FIG. 5) in making its determination. The number of reuse units 40 will often be less than the maximum number allocated through channel allocation table 86 (see FIG. 5). Task 106 desirably determines that a minimum number of one reuse unit 40 is required for each beam 32 regardless of current demand. Thus, at least one reuse unit will be made available in each beam 32 so that spectrum will be available for subscriber units 26 (see FIG. 1) to initiate contact with switch 42.

After task 106, a task 108 identifies and saves a subset of interface segments (see FIG. 4) to use for accommodating the new and ongoing calls. This subset of segments desirably includes less than all segments included in switch 42 unless actual call traffic demand is at or near switch capacity. Referring briefly to FIG. 4, as an example situation, segments which reside outside a dotted-line box 110 are included in the subset and considered subset segments, while segments within box 110 are non-subset segments. Of course, the number of segments included in the subset will vary in accordance with actual call traffic.

Referring back to FIG. 7, task 108 desirably includes as few segments in the subset as possible because fewer segments lead to reduced power consumption. Conversely, if too few segments are included in the subset, then finding connections through switch 42 for all ongoing calls plus a new call using only the subset segments may be an impossible task. In addition, if too few segments are included in the subset, then the process of finding connections through switch 42 for all ongoing calls plus a new call may be possible but may take too long.

Task 108 may utilize a decision criteria similar to that illustrated in a table 112, shown in FIG. 7. Generally, task 108 may identify subset segments in response to connection determination duration and call traffic demand. If call traffic demand has decreased since the last connection determination and the previous connection determination duration was shorter than a target duration, then task 108 may shrink the subset to include fewer segments. Call traffic demand may decrease in spite of the addition of a new call because of terminated calls. If call traffic demand has increased and the prior connection determination was longer than the target duration, then task 108 may expand the subset to include more segments. However, if demand is higher while a prior connection determination duration was shorter or if demand is lower while a prior connection determination duration was longer then task 108 may keep the subset of segments about the same as used for a previous iteration of process 96.

After task 108, a task 114 assigns trial configuration parameters for the segments in the identified subset. These parameters specify channelizer tuning for channelizers included in the subset along with connection selection settings for the switch fabric segments included in the subset. The precise algorithm used to identify these parameters is not important to the present invention. One convenient technique assigns reuse units 40 to channelizers as efficiently as possible, then attempts different combinations of switch fabric connections until a combination successfully connects all ongoing calls plus the new call without blocking.

After or in combination with task 114, a query task 116 determines whether the trial configuration is realizable within the identified subset of segments. If the subset is unrealizable, then the subset definition includes too few segments, and a task 118 expands and saves a new segment subset definition. After task 118, program control loops back to task 114 to assign new trial configuration parameters and to seek a set of connections through the subset segments that accommodates all ongoing calls plus the new call.

When task 116 eventually determines that the latest trial configuration has generated a realizable set of parameters, a task 120 saves the current time. From the times saved in tasks 104 and 120, a duration can be calculated for use in future iterations of task 108. After task 120, a task 122 sets up the final trial configuration parameters. These parameters will allow the identified subset of segments to accomplish all new connections for the ongoing calls plus the new call. These parameters are setup so that they can later be quickly put in place to reconfigure switch 42 in accordance with the new connections. Task 122 refrains from setting up any parameter which would utilize a nonsubset segment. The parameters specify channelizer segment tuning and connections through switch fabric segments for the segments included in the identified subset.

After task 122, program control remains at a task 124 until the end of a frame. When the end of a frame is detected, a task 126 activates the subset segments to operate in a full power mode and switches in the new parameters setup in task 122 to implement the new connections. In implementing the new parameters, task 126 updates network call assignment table 98 (see FIG. 5) with new identities for all network ports 66 (see FIG. 4) that have changed through the operation of process 96. After task 126, a task 128 deactivates any non-subset segments to the standby mode so that they will consume as little power as possible.

The results of process 96 are illustrated in FIG. 4. Prior to performing process 96, ongoing calls connected through switch 42 between user ports 44 and network ports 66 include connection 56. As a hypothetical example, connection 56 is routed through switch fabric segment 48', switch fabric segment 54', channelizer group 62', and modem group 64'. A new call may, for example, require the use of a user port 44 which couples to a switch fabric segment 48". Process 96 redefines all connections through switch 42 so that ongoing calls plus the new call may be successfully connected. Whether the new call may have been blocked by connections for the ongoing calls is not relevant in the preferred embodiment. However, due to the use of as few segments as necessary to implement connections for the ongoing calls, the new call would likely have been blocked.

Process 96 defines a connection 130 through segments to accommodate the new call. At the same time, process 96 redefines connection 56 as a new connection 56'. Connection 56' for the ongoing call differs from the ongoing call's prior connection 56 and uses a different network port 66 as a result. As a consequence of the change to connection 56', in the next frame a different channelizer will modulate and demodulate RF signals to and from the subscriber unit 26 (see FIG. 1) using connection 56'. However, the subscriber unit 26 using connections 56 and 56' continues to use the same communication channel.

Nothing requires process 96 to actually alter the route of connections for ongoing calls. However, due to the use of as few segments as possible for routing connections, at least some connections for ongoing calls are likely to change during each iteration of process 96. Over the course of many iterations connections for some ongoing calls will change.

Process 96 also deactivates non-subset segments, as illustrated in box 110. Since peak call traffic occurs only seldom, some of segments may remain in a standby mode for the majority of the time to reduce power consumption.

In summary, the present invention provides a switch that is unlikely to fail to provide communication services, even during periods of high traffic, while meeting severe power consumption and other constraints typical of operation in satellites.

The present invention has been described above with reference to preferred embodiments. However, those skilled in the art will recognize that changes and modifications may be made in these preferred embodiments without departing from the scope of the present invention. For example, those skilled in the art will appreciate that the present invention is not limited only to cellular telecommunications or to switches located in satellites. The specific partitioning and organization of the switch may change from application to application. Likewise, the specific memory data structures and task organization and sequencing discussed herein in connection with preferred embodiments may be altered while still accomplishing substantially equivalent processes and achieving substantially equivalent switching structures. These and other changes and modifications which are obvious to those skilled in the art are intended to be included within the scope of the present invention.

What is claimed is:

1. A method for operating a communication network switch to match switching resources with call traffic demand, said switch having network ports and user ports, said switch having a controller and said method comprising the steps of:

routing ongoing calls between a portion of said network ports and a portion of said user ports so that each ongoing call has a first ongoing connection through said switch;

receiving a request to set-up a new call;

identifying by said controller, in response to said receiving step, a new connection between said network ports and said user ports for said new call, identifying by said controller, in response to said receiving step, a second ongoing connection between said network ports and said user ports for each of said ongoing calls, wherein a portion of said second ongoing connections differs from said first connections; and implementing said second ongoing connections for said ongoing calls and said new connection for said new call, said ongoing calls remaining uninterrupted during the implementing step.

2. The method as claimed in claim 1 wherein said method additionally comprises the step of placing said switch in an orbiting satellite.

3. The method as claimed in claim 1 wherein:

said communication network switch is a cellular base station having a coverage area extending over a plurality of cells;

said method additionally comprises the step of configuring said switch to include a plurality of channelizers through which said ongoing and new calls are connected;

said method additionally comprises the step of receiving data which identify reuse units to use in said cells, wherein each reuse unit includes a plurality of communication channels; and said identifying steps comprises the step of assigning at least a portion of said reuse units to a first portion of said channelizers and deactivating a second portion of said channelizers.

4. The method as claimed in claim 3 wherein said identifying steps further comprises the step of determining, prior to said assigning step, how many reuse units are required to accommodate said ongoing and new calls.

5. The method as claimed in claim 1 wherein:

said switch includes a plurality of interfacing segments coupled between said network and user ports;

said implementing step uses a first portion of said segments to implement said new connections; and said method additionally comprises the step of deactivating a second portion of said segments in response to said identifying steps.

6. The method as claimed in claim 1 wherein:

said ongoing calls are partitioned in time into frames; and said implementing step occurs between two of said frames.

7. The method as claimed in claim 1 wherein said switch has a first bank of switching segments connected to a second bank of switching segments so that said new connections will block other connections through said switch.

8. The method as claimed in claim 1 wherein:

said switch includes a plurality of interfacing segments coupled between said network and user ports; and said identifying steps comprises the step of identifying a subset of said segments to use for accommodating said new connection and said second ongoing connections.

9. The method as claimed in claim 8 additionally comprising the steps of:

monitoring the duration of said identifying steps;

receiving a request to set-up a second new call; and repeating said identifying said new connection step including the step of identifying said subset, in response to said request to set-up said second new call, wherein said identifying said subset step is responsive to said duration.

10. The method as claimed in claim 8 wherein said identifying steps further comprise, after said identifying said subset step, the steps of:

a) determining a trial configuration for said subset of segments;

b) determining whether said trial configuration is realizable using said subset of segments;

c) expanding said subset of segments when said step b) determines that said trial configuration is not realizable; and d) repeating said steps a) and b).

11. A method for operating a communication network switch to match switching resources with call traffic demand, said switch having network ports and user ports and a plurality of interfacing segments coupled between said network ports and said user ports, said switch having a controller coupled to said interfacing segments, said method comprising the steps of:

routing ongoing calls between a portion of said network ports and a portion of said user ports so that each ongoing call has a first ongoing connection through said switch;

receiving a request to set-up a new call;

said controller identifying, in response to said receiving step, a subset of said segments to use for accommodating each ongoing call and said new call;

said controller identifying a new connection between said network ports and said user ports for said new call;

said controller identifying, a second ongoing connection between said network ports and said user ports for each of said ongoing calls, said new connection and each second ongoing connection refraining from using ones of said segments which are not included in said subset; and implementing said new for said new call, and each second ongoing connection for each ongoing call said ongoing calls remaining uninterrupted during the implementing step.

12. The method as claimed in claim 11 wherein:

said ongoing connections for a portion of said ongoing calls use first paths through said segments; and said new connections for said portion of said ongoing calls use second paths through said segments, said second paths differing from said first paths.

13. The method as claimed in claim 11 additionally comprising the step of deactivating ones of said segments which are not included in said subset.

14. The method as claimed in claim 11 wherein said segments include a first bank of switching segments connected to a second bank of switching segments so that said new connections will block other connections through said switch.

15. The method as claimed in claim 11 additionally comprising the steps of:

monitoring the duration of said identifying a new connection and second connection steps;

receiving a request to set-up a second new call; and repeating said identifying a new connection and second connection steps, including said identifying said subset step, in response to said request to set-up said second new call, wherein said identifying said subset step is responsive to said duration monitored in said monitoring step.

16. The method as claimed in claim 11 wherein said identifying steps further comprise, after said identifying step, the steps of:

a) determining a trial configuration for said subset of segments;

b) determining whether said trial configuration is realizable using said subset of segments;

c) expanding said subset of segments when said step b) determines that said trial configuration is not realizable; and d) repeating said steps a) and b).

17. The method as claimed in claim 11 wherein:

said switch is a cellular base station having a coverage area extending over a plurality of cells;

a portion of said segments include a plurality of channelizers;

said method additionally comprises the step of receiving data which identify reuse units to use in said cells, wherein each reuse unit includes a plurality of communication channels; and said identifying a new connection and second connection steps comprise the step of assigning said reuse units to a first portion of said channelizers and deactivating a second portion of said channelizers.

18. The method as claimed in claim 17 wherein said identifying a new connection and second connection steps further comprise the step of determining, prior to said assigning step, how many reuse units are required to accommodate said ongoing calls and said new call.

19. A communication network switch which matches switching resources with call traffic demand, said switch comprising:

a first plurality of network ports;

a second plurality of user ports;

a plurality of interfacing segments coupled between said network and user ports; and a controller coupled to said interfacing segments to establish connections between a portion of said network ports and a portion of said user ports for ongoing calls so that each ongoing call has a first ongoing connection through said interfacing segments and to establish, in response to receiving a request to set-up a new call, a new connection between said network ports and said user ports for said new call, and to establish for each ongoing call, a second ongoing connection through said interfacing segments, wherein a portion of said second ongoing connections from said first ongoing connections, said ongoing calls remaining uninterrupted during the establishing of said new connection and said second ongoing connections.

20. The switch as claimed in claim 19 wherein:

said controller is configured to select a subset of said segments for use in establishing said new connections; and said segments are configured to be deactivated if not included in said subset.

21. A communication network switch which matches switching resources with call traffic demand, said switch comprising:

a first plurality of network ports;

a second plurality of user ports;

a plurality of interfacing segments coupled between said network and user ports; and a controller coupled to said interfacing segments to establish connections between a portion of said network ports and a portion of said user ports for ongoing calls so that each ongoing call has a first ongoing connection through said interfacing segments and to establish, in response to receiving a request to set-up a new call, a new connection between said network ports and said user ports for said new call, and to establish for each ongoing call, a second ongoing connection through said interfacing segments, wherein a portion of said second ongoing connections from said first ongoing connections wherein said segments include a first bank of switching segments coupled to a second bank of switching segments so that said second ongoing connections and said new connection will block other connections through said switch.

22. The switch as claimed in claim 19 wherein:

said switch is included in a cellular base station having a coverage area extending over a plurality of cells;

said segments include a plurality of channelizers; and said controller is configured to receive data which identify reuse units to use in said cells, wherein each reuse unit includes a plurality of communication channels, and said controller is configured to assign said identified reuse units to a first portion of said channelizers and to deactivate a second portion of said channelizers.

* * * * *